(12) United States Patent
Haratsch et al.

(10) Patent No.: US 6,690,754 B1
(45) Date of Patent: Feb. 10, 2004

(54) METHOD AND APPARATUS FOR REDUCING THE COMPUTATIONAL COMPLEXITY AND RELAXING THE CRITICAL PATH OF REDUCED STATE SEQUENCE ESTIMATION (RSSE) TECHNIQUES

(75) Inventors: Erich Franz Haratsch, Bradley Beach, NJ (US); Harish Viswanathan, Matawan, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/326,785

(22) Filed: Jun. 4, 1999

(51) Int. Cl.[7] .................................................. H04L 1/00
(52) U.S. Cl. ........................................................ 375/346
(58) Field of Search ................................ 375/316, 346, 375/350

(56) References Cited

U.S. PATENT DOCUMENTS

| | | | |
|---|---|---|---|
| 5,319,585 A | * 6/1994 | Amrany | 706/322 |
| 5,617,450 A | * 4/1997 | Kakuishi et al. | 375/230 |
| 5,742,642 A | * 4/1998 | Fertner | 375/233 |
| 5,870,433 A | 2/1999 | Huber et al. | |
| 6,035,006 A | 3/2000 | Matui | |
| 6,081,566 A | * 6/2000 | Molnar et al. | 342/354 |
| 6,151,370 A | * 11/2000 | Wei | 375/262 |
| 6,201,831 B1 | 3/2001 | Agazzi et al. | |
| 6,426,972 B1 | * 7/2002 | Endres et al. | 375/229 |
| 6,437,932 B1 | * 8/2002 | Prater et al. | 360/46 |

OTHER PUBLICATIONS

R. Chevillat and E. Eleftheriou, "*Decoding of Trellis–Encoded Signals in the Presence of Intersymbol Interference and Noise*", IEEE Trans. Commun., Jul. 1989, vol. 37, pp. 669–676.

A. Duel–Hallen, "*Delayed Decision–Feedback Sequence Estimation*", IEEE Trans. Commun, May 1989, vol. 37, No. 5.

M.V. Eyuboglu and S.U.H. Qureshi, "*Reduced–State Sequence Estimation for Coded Modulation On Intersymbol Interference Channels*", IEEE JSAC., Aug. 1989, vol. 7, pp. 989–995.

R. Raheli, G. Marino, and P. Castoldi, "*Per–Survivor Processing and Tentative Decisions: What is in Between?*" IEEE Trans. Commun., Feb. 1996, vol. 44, pp. 127–129.

S.L. Ariyavisitakul and Ye Li, "Joint Coding and Decision Feedback Equalization for Broadband Wireless Channels," IEEE Journal on Selected Areas in Communications, vol. 16, No. 9, 1670–78 (Dec. 1998);

G. Fettweis and H. Meyr, "High–Speed Parallel Viterbi Decoding: Algorithm and VLSI–Architecture," IEEE Communications Magazine, 46–55 (May, 1991);

N. Seshadri and J.B. Anderson, "Decoding of Severely Filtered Modulation Codes Using the (M, L) Algorithm," IEEE Journal on Selected Areas in Communications, vol. 7, No. 6, 1006–1016 (Aug. 1989).

Lee et al., "A Maximum–Likelihood Sequence Estimator with Decision–Feedback Equalization," IEEE Transactions on Communications, vol. Com–25, No. 9, 971–979 (Sep. 1997).

* cited by examiner

Primary Examiner—Tesfaldet Bocure
Assistant Examiner—Pankaj Kumar
(74) Attorney, Agent, or Firm—Ryan, Mason & Lewis, LLP

(57) ABSTRACT

A method and apparatus are disclosed for reducing the complexity of reduced state sequence estimation (RSSE) techniques for a given number of states while also reducing the critical path problem. The intersymbol interference due to the less significant tail taps of the channel impulse response is processed with a lower complexity cancellation algorithm using tentative decisions, while the intersymbol interference due to the more significant initial taps is processed with a more complex cancellation algorithm, such as a reduced state sequence estimation technique or an M-algorithm technique. A receiver is disclosed that includes a circuit for processing intersymbol interference due to the less significant tail taps using tentative decisions and an RSSE circuit for processing the intersymbol interference due to the more significant taps.

22 Claims, 3 Drawing Sheets

METHOD AND APPARATUS FOR REDUCING THE COMPUTATIONAL COMPLEXITY AND RELAXING THE CRITICAL PATH OF REDUCED STATE SEQUENCE ESTIMATION (RSSE) TECHNIQUES

FIELD OF THE INVENTION

The present invention relates generally to channel equalization and decoding techniques, and more particularly, to sequence estimation techniques with reduced complexity.

BACKGROUND OF THE INVENTION

The transmission rates for local area networks (LANs) that use twisted pair conductors have progressively increased from 10 Megabits-per-second (Mbps) to 1 Gigabit-per-second (Gbps). The Gigabit Ethernet 1000 Base-T standard, for example, operates at a clock rate of 125 MHz and uses four copper pairs to transmit 1 Gbps. Trellis-coded modulation (TCM) is employed by the transmitter, in a known manner, to achieve asymptotic coding gains. The signals arriving at the receiver are typically corrupted by intersymbol interference (ISI), crosstalk, echo, and noise. A major challenge for receivers in such a channel environment is to jointly equalize the channel and decode the corrupted trellis-coded signals at such high clock rates. As the high processing speed requires a parallel implementation without resource sharing, managing hardware complexity becomes difficult. Another issue is to meet the speed requirements, as the algorithms for joint equalization and decoding incorporate non-linear feedback loops which cannot be pipelined.

Data detection is often performed using maximum likelihood sequence estimation (MLSE), to produce the output symbols or bits. A maximum likelihood sequence estimator considers all possible sequences and determines which sequence was actually transmitted, in a known manner. The maximum likelihood sequence estimator is the optimum decoder and applies the well-known Viterbi algorithm to the combined code and channel trellis. For a more detailed discussion of a Viterbi implementation of a maximum likelihood sequence estimator, see Gerhard Fettweis and Heinrich Meyr, "High-Speed Parallel Viterbi Decoding Algorithm and VLSI-Architecture," IEEE Communication Magazine (May 1991), incorporated by reference herein.

The computation and storage requirements of the Viterbi algorithm are proportional to the number of states. The number of states of the combined trellis is given by $S \times 2^{mL}$, where S is the number of code states, m is the number of bits for each information symbol, and L is the length of the channel memory. For the Gigabit Ethernet standard, for example, S=8, m=8, and L≈10, which leads to a prohibitively expensive Viterbi algorithm with about $10^{25}$ states.

In order to manage the hardware complexity for the maximum likelihood sequence estimator that applies the Viterbi algorithm, a number of sub-optimal approaches, such as "reduced state sequence estimation (RSSE)" algorithms, have been proposed or suggested. For a discussion of reduced state sequence estimation techniques, see, for example, P. R. Chevillat and E. Eleftheriou, "Decoding of Trellis-Encoded Signals in the Presence of Intersymbol Interference and Noise", IEEE Trans. Commun., vol. 37, 669–76, (July 1989) and M. V. Eyuboglu and S. U. H. Qureshi, "Reduced-State Sequence Estimation For Coded Modulation On Intersymbol Interference Channels", IEEE JSAC, vol. 7, 989–95 (August 1989), each incorporated by reference herein.

Generally, reduced state sequence estimation techniques reduce the complexity of the maximum likelihood sequence estimators by merging multiple states of the full combined channel/code trellis. Although RSSE techniques reduce the number of states for Viterbi decoding, the required computations are still too complex at the high clock rates associated with the Gigabit Ethernet standard, as the high processing speeds require a parallel implementation without resource sharing. In addition, the RSSE technique incorporates non-linear feedback loops which cannot be pipelined. The critical path associated with these feedback loops is the limiting factor for high-speed implementations. Simplifying the RSSE technique by further reducing the number of states or by doing separate equalization with a decision-feedback equalizer (DFE) and decoding of the TCM codes comes often with a significant penalty in terms of signal-to-noise ratio (SNR) performance. As apparent from the above-described deficiencies with conventional reduced state sequence estimation algorithms, a need exists for a reduced state sequence estimation algorithm that reduces the hardware complexity of RSSE techniques for a given number of states and also relaxes the critical path problem.

SUMMARY OF THE INVENTION

Generally, a method and apparatus are disclosed for reducing the complexity of the RSSE technique for a given number of states while also relaxing the critical path problem. A communications channel is represented using a discrete time model, where the channel impulse response has a memory length, L, denoted by $\{f_k\}_{k=0}^{L}$, where $f_k$ is the coefficient for channel tap k. The signal energy of a pulse that has gone through a minimum-phase channel is concentrated in the initial taps. As used herein, taps one through U are referred to as the initial taps, and taps U+1 through L are referred to as the tail taps, where U is a prescribed number. In one implemenatation, the tap number, U, is selected to ensure that the initial taps contribute a predefined percentage of the overall signal energy.

According to one aspect of the invention, the less significant tail taps (U+1 through L) are processed with a lower complexity cancellation algorithm, such as a decision-feedback equalizer technique, that cancels the tail taps using tentative decisions. Thereafter, only the more significant initial taps (1 through U) are processed with a reduced state sequence estimation technique. The DFE technique initially removes the intersymbol interference associated with the tail taps, then the RSSE technique is applied only to the more important tail taps. Thus, only taps one through U are processed using the RSSE technique, while taps U+1 through L are processed with a lower complexity decision-feedback equalizer. The present invention does not further reduce the number of states which are processed in the RSSE circuit, thus ensuring a good bit error rate versus signal-to-noise ratio performance for a well-chosen value of U. Meanwhile, the computational complexity and processing time of the decision-feedback computations in the RSSE circuit are substantially reduced. The hardware complexity of the survivor memory unit (SMU) in the RSSE circuit can also be reduced.

A receiver is disclosed that includes a tentativnre decision/tail processing circuit for processing the less significant tail taps and an RSSE circuit for processing the initial taps. The tentative decision/tail processing circuit processes the less significant tail taps with a lower complexity DFE algorithm, to cancel the tail taps using tentative decisions. The RSSE circuit processes only the initial taps with the RSSE technique.

DETAILED DESCRIPTION

Figure 1:
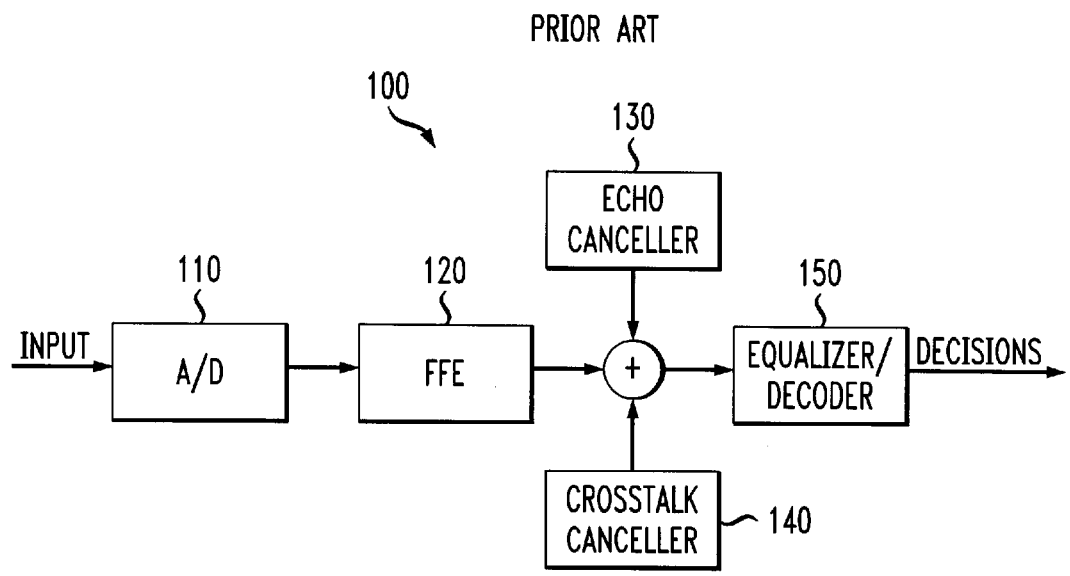
FIG. 1 is a schematic block diagram of a conventional receiver.

FIG. 1 shows the block diagram for a conventional receiver 100 in a channel environment associated with, for example, the Gigabit Ethernet 1000 Base-T standard. A major challenge for such receivers 100 is to jointly equalize the channel and decode the corrupted trellis-coded signals at the high clock rates of the Gigabit Ethernet 1000 Base-T standard. As shown in FIG. 1, the receiver 100 includes an analog-to-digital (A/D) converter 100 for converting the received analog signal to a digital signal. The digitized data is then processed by a feed forward equalizer (FFE) 120, an echo canceller 130 and a crosstalk canceller 140. Generally, the feed forward equalizer 120 makes the channel impulse response causal and minimum-phase, and additionally whitens the noise. In addition, the echo canceller 130 removes echo from the received signal and the crosstalk canceller 140 removes the crosstalk, in a known manner. The equalizer/decoder 150 performs data detection, for example, using maximum likelihood sequence estimation, to produce the output symbols or bits.

Figure 2:
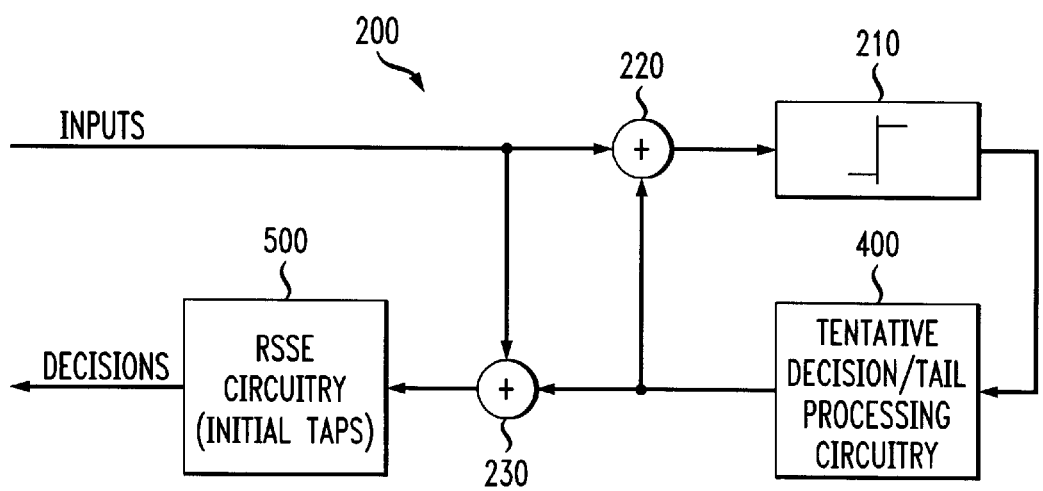
FIG. 2 is a schematic block diagram of a receiver in accordance with the present invention.
Figure 3:
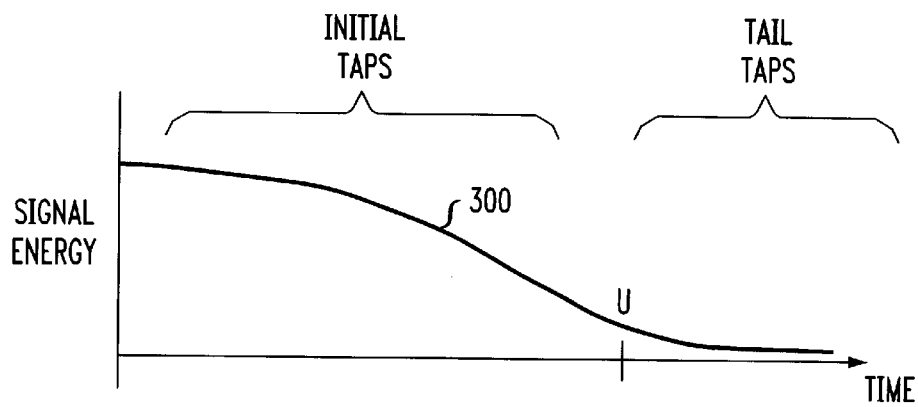
FIG. 3 illustrates the signal energy of a pulse that has undergone dispersion through a minimum-phase channel.

FIG. 2 illustrates a receiver 200 in accordance with the present invention that reduces the hardware complexity of reduced state sequence estimation algorithms for a given number of states, while also relaxing the critical path problem. A communications channel is represented using a discrete time model, where the channel impulse response has a length, L, denoted by $\{f_k\}_{k=0}^{L}$, where $f^k$ is the coefficient for channel tap k. In minimum-phase channels, the signal energy of a pulse that has undergone channel dispersion is concentrated in the initial taps. As shown in FIG. 3, the initial taps provide the largest contribution to the signal energy of the channel output, and the corresponding power decreases to zero as the taps approach infinity. As used herein, taps one through U are referred to as the initial taps, and taps U+1 through L are referred to as the tail taps, where U is a prescribed number. For example, the tap number, U, can be established using simulations or experimental results to ensure that the initial taps contribute a predefined percentage of the overall signal energy.

According to a feature of the present invention, the less significant tail taps are processed with a lower complexity cancellation algorithm, such as a decision-feedback equalizer technique, that cancels the tail taps using tentative decisions. Thereafter, only the initial taps are processed with a reduced state sequence estimation technique. Thus, the DFE technique initially removes the intersymbol interference associated with the tail taps, then the RSSE technique is applied only to the more important tail taps. Thus, for a channel having a memory, L, taps one through U are processed using the RSSE technique and taps U+1 through L are processed with a lower complexity decision-feedback equalizer.

FIG. 2 is a schematic block diagram of a receiver 200 in accordance with the present invention. The receiver 200 includes a slicer 210 that slices the digital data into symbol values. In addition, the receiver 200 includes tentative decision/tail processing circuitry 400, discussed further below in conjunction with FIG. 4, for processing the less significant tail taps with a lower complexity cancellation algorithm, such as a decision-feedback equalizer technique, to cancel the tail taps using tentative decisions. The receiver 200 also includes RSSE circuitry 500, discussed further below in conjunction with FIG. 5, for processing only the initial taps with a reduced state sequence estimation technique (FIG. 5).

Figure 4:
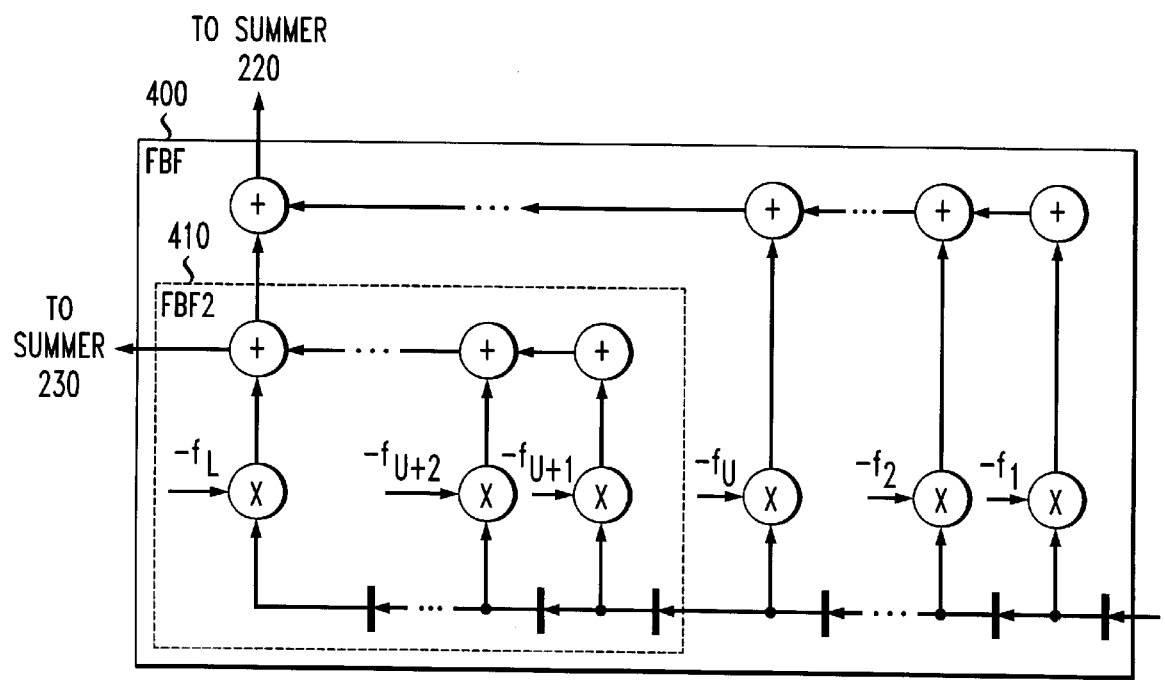
FIG. 4 illustrates an implementation of the tentative decision/tail processing circuitry of FIG. 2.
Figure 5:
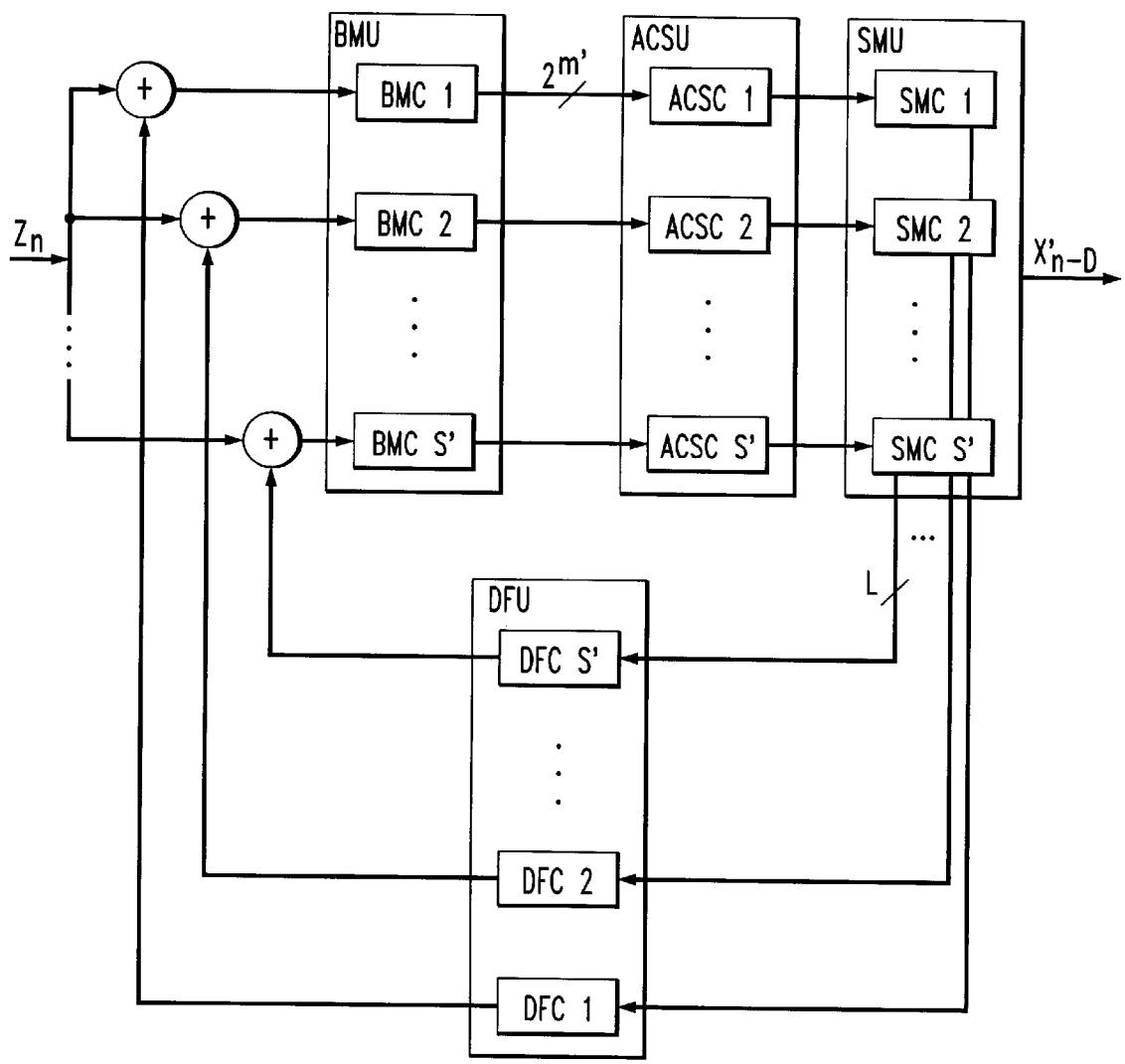
FIG. 5 illustrates an implementation of the reduced state sequence estimation circuitry of FIG. 2.

FIG. 4 illustrates a decision-feedback equalizer implementation of the tentative decision/tail processing circuitry 400 of FIG. 2. As shown in FIG. 4, a feedback filter (FBF2) 410 takes tentative decisions obtained from a DFE structure (FBF) 400 and removes the less significant intersymbol interference introduced by the tail channel taps $\{f_k\}_{k=U+1}^{L}$, where $K \leq U \leq L$. The remaining severe intersymbol interference introduced by only the initial channel taps $\{f_k\}_{k=1}^{U}$ is then treated in the RSSE circuitry 500.

When U=L, the output of the feedback filter 410 does not affect the input to the RSSE circuitry 500 such that the structure operates like a full reduced state sequence estimator (RSSE). If K is the number of taps that are accounted for in the combined code and channel state inside the RSSE circuitry 500, then choosing U=K leads to a structure, where feedback filter 410 cancels all intersymbol interference which is not accounted for in the combined code and channel state. It is again noted that the design parameter U can be chosen to trade-off performance and hardware complexity.

The lower the value for the threshold, U, the less complex the decision feedback unit (DFU) in the RSSE circuitry 500, discussed below, as less intersymbol interference taps are accounted for in each decision feedback cell (DFC). However, this comes at the expense of a signal-to-noise ratio penalty due to error propagation effects in the feedback filter 410. Low values for U also relax the critical path problem in the feedback loop inside the RSSE circuitry 500 as the number of terms which have to be added in the decision feedback cell is proportional to U. The critical path inside the RSSE circuit, consisting of the decision-feedback cell, branch metric cell (BMC), add-compare-select cell (ACSC) and survivor memory cell (SMC), as shown in FIG. 5, is the bottleneck for high speed implementations of the RSSE technique. The tentative decision/tail processing circuitry 400, according to FIG. 2, is not part of the critical path.

In many practical situations, where the channel is minimum-phase, which can be accomplished with a feed forward equalizer, a low value of U is sufficient to achieve approximately the same bit error rate versus signal-to-noise ratio performance as a conventional RSSE circuit, which cancels the intersymbol interference introduced by all L channel taps. However, the present invention reduces the computational complexity of the decision-feedback unit L/U times, in addition, computational delay through the decision feedback cell (FIG. 5) is reduced L/U times so that the critical path problem is relaxed significantly as well. The present invention also allows for a survivor depth D of the survivor memory unit, which is smaller than L. In a conventional RSSE circuit, the survivor depth D must be at least L, as the L past survivor symbols are needed for the computations in the decision feedback unit. Thus, the present invention also allows for a hardware reduction of the survivor memory unit (FIG. 5).

In the case of decision-feedback sequence estimation (DFSE), which is a specialization of the RSSE technique, and U=K, the decision feedback unit and thus the feedback loop is removed and the decision-feedback sequence estimation becomes a pure Viterbi decoder. Thus, for this special case of decision-feedback sequence estimation with U equal to K, the present invention permits pipelining in all processing blocks outside the add-compare-select unit (ACSU), and the critical path reduces to one add-compare-select cell.

While the tentative decision/tail processing circuitry 400 has been implemented in FIG. 4 using a decision-feedback equalizer, the tentative decision/tail processing circuitry 400 could likewise be implemented using a soft DFE approach. For a discussion of soft DFE techniques, see, for example, S. L. Ariyavisitakul and Y. Li, "Joint Coding and Decision Feedback Equalization for Broadband Wireless Channels", IEEE Journal on selected Areas in Communications, vol. 16, no. 9, December 1998, incorporated by reference herein.

As previously indicated, FIG. 5 illustrates the reduced state sequence estimation circuit of FIG. 2 which processes only the initial taps of the channel impulse response. As previously indicated, reduced state sequence estimation techniques reduce the complexity of the maximum likelihood sequence estimators by merging multiple states of the full combined channel/code trellis. For a more detailed discussion of conventional reduced state sequence estimation techniques that process all taps of the channel impulse response, see, for example, P. R. Chevillat and E. Eleftheriou, "Decoding of Trellis-Encoded Signals in the Presence of Intersymbol Interference and Noise", IEEE Trans. Commun., vol. 37, 669–76, (July 1989) and M. V. Eyuboglu and S. U. H. Qureshi, "Reduced-State Sequence Estimation For Coded Modulation On Intersymbol Interference Channels", IEEE JSAC, vol. 7, 989–95 (August 1989), each incorporated by reference above.

Reduced state sequence estimation considers only partial information about the information symbol for the reduced combined trellis. The resulting reduced combined state is expressed as $\rho_n=(\sigma_{n-K}; X_{n-K}^{m_K}, \ldots, X_{n-1}^{m_1})$ where $X_{n-i}^{m_i}$ contains the $m_i$ bits of the information symbol $X_{n-i}$ which are considered for the reduced trellis. It is required that $m' \leq m_K \leq m_{K-1} \leq \ldots \leq m_1 \leq m$, where m' is the number of information bits which are sent into the convolutional encoder of the TCM encoder. The reduced trellis has $S'=S \times 2^{m_1+ \cdots +m_K}$ states.

FIG. 5 shows a block diagram for reduced state sequence estimation which is also valid for its specializations, decision-feedback sequence estimation and PDFE. S' soft output values are computed by the S' decision-feedback cells in the decision-feedback unit based on the survivors in the survivor memory unit and fed into the branch metric unit (BMU), in which each branch metric cell computes the metrics for the $b=2^{m'}$ transitions emanating from the corresponding state. Each decision-feedback cell takes L past symbols from the corresponding survivor memory cell.

Decision-feedback sequence estimation is a specialization of reduced state sequence estimation and employs a trellis that takes into account only the first K of the L channel coefficients $\{f_k\}$, $0 \leq K \leq L$. The combination of the code state and truncated channel state defines the reduced combined state $\mu_n=(\sigma_{n-K}; X_{n-K}, \ldots, X_{n-1})$, where $\sigma_n$ is the code state at time n, and $X_{n-K}, \ldots, X_{n-1}$ are the k previously sent information symbols. Intersymbol interference terms not represented in the combined state are estimated and subtracted in the metric computation using the path history of each state. A special case arises when K=0, where the reduced trellis becomes the TCM code trellis and decision-feedback equalization is performed for each code state based on the survivor history of that path. This is called parallel decision-feedback equalization (PDFE). Decision-feedback sequence estimation follows from reduced state sequence estimation with $m_1= \ldots =m_K=m$.

In an alternate implementation, the RSSE circuit 500 may be replaced by an M-algorithm (MA). The M-algorithm techniques work on the complete combined trellis, but retain at each processing step only M paths with the best metrics. For a discussion of M-algorithms, see, for example, N. Seshadri and J. B. Anderson, "Decoding of Severely Filtered Modulation Codes Using the (M,L) Algorithm", IEEE JSAC, vol. 7, 1006–1016 (August 1989), incorporated by reference herein.

Generally, the M-algorithm uses M DFEs to cancel the intersymbol interference for the M best paths. At each processing cycle, each of these M paths is extended by its $b=2^m$ extensions, then the resulting bM paths are tested for duplicate paths and sorted to find the M best paths. The M-algorithm is not as inherently parallel as the reduced state sequence estimation implementation shown in FIG. 5 or the Viterbi algorithm itself, as the testing and sorting operation in the add-test-sort unit (ATSoU) is performed over all bM path extensions. Each decision-feedback cell takes L past symbols from the corresponding survivor memory cell.

In the alternate embodiment, the M-algorithm would process the combined trellis that results from the concatenation of the TCM code and a channel with the first U taps of the channel impulse response. The tail of the channel impulse response would be processed with a lower complexity cancellation algorithm as discussed above.

It is to be understood that the embodiments and variations shown and described herein are merely illustrative of the principles of this invention and that various modifications may be implemented by those skilled in the art without departing from the scope and spirit of the invention.

We claim:

1. A method for processing a signal received from a dispersive channel, said channel being modeled as a filter having L+taps, said method comprising the steps of:
   processing intersymbol interference due to less significant taps with a lower complexity cancellation algorithm using tentative decisions; and
   processing intersymbol interference due to more significant taps with a reduced state sequence estimation technique.

2. The method according to claim 1, wherein said lower complexity cancellation algorithm is a decision-feedback equalizer technique.

3. The method according to claim 1, wherein said lower complexity cancellation algorithm is a soft decision-feedback equalizer technique.

4. The method according to claim 1, wherein said lower complexity cancellation algorithm reduces the intersymbol interference associated with said less significant taps.

5. The method according to claim 1, wherein said more significant taps comprise taps below a tap number, U, where U is a prescribed number less than L.

6. The method according to claim 1, wherein a partial decision feedback equalization filtering technique processes said intersymbol interference due to said less significant taps.

7. The method according to claim 1, wherein said reduced state sequence estimation technique estimates intersymbol interference terms based on a path history of each state.

8. The method according to claim 5, wherein said intersymbol interference due to said U more significant taps is processed with said reduced state sequence estimation technique for each state based on survivor symbols.

9. The method according to claim 1, wherein said reduced state sequence estimation technique is a decision-feedback sequence estimation technique.

10. The method according to claim 1, wherein said reduced state sequence estimation technique is a parallel decision-feedback equalization technique.

11. A receiver that receives a signal from a dispersive channel, said channel being modeled as a filter having L+taps, comprising:
- a first circuit for processing intersymbol interference due to less significant taps with a lower complexity cancellation algorithm using tentative decisions; and
- a reduced state sequence estimation circuit for processing intersymbol interference due to only the more significant taps.

12. The receiver according to claim 11, wherein said first circuit implements a decision-feedback equalizer technique to cancel said less significant taps using tentative decisions.

13. The receiver according to claim 11, wherein said lower complexity cancellation algorithm is a soft decision-feedback equalizer technique.

14. The receiver according to claim 11, wherein said lower complexity cancellation algorithm reduces the intersymbol interference associated with said less significant taps.

15. The receiver according to claim 11, wherein said more significant taps comprise taps below a predefined tap number, U, where U is less than L.

16. The receiver according to claim 15, wherein a filter section with L-U filter taps that uses said tentative decisions processes said intersymbol interference due to said less significant taps.

17. The receiver according to claim 11, wherein said reduced state sequence estimation circuit employs a decision-feedback sequence estimation technique.

18. The receiver according to claim 11, wherein said reduced state sequence estimation circuit employs a parallel decision-feedback equalization technique.

19. The receiver according to claim 11, wherein said reduced state sequence estimation technique has a survivor memory unit with a survivor memory depth D that is smaller than L.

20. A method for processing a signal received from a dispersive channel, said channel being modeled as a filter having L+taps, said method comprising of steps of:
- processing intersymbol interference due to less significant taps with a lower complexity cancellation algorithm using tentative decisions; and
- processing intersymbol interference due to more significant taps with an M-algorithm technique.

21. A receiver that receives a signal from a dispersive channel, said channel being modeled as a filter having L+taps, comprising:
- a circuit for processing intersymbol interference due to less significant taps with a lower complexity cancellation algorithm using tentative decisions; and
- a sequence estimation circuit that implements an M-algorithm for processing intersymbol interference due to only the more significant taps.

22. A receiver that receives a signal from a dispersive channel, said channel modeled as a filter having L+taps, comprising:
- means for processing intersymbol interference due to less significant taps with a lower complexity cancellation algorithm using tentative decisions; and
- means for processing intersymbol interference due to more significant taps with a reduced state sequence estimation technique.

* * * * *

UNITED STATES PATENT AND TRADEMARK OFFICE
CERTIFICATE OF CORRECTION

PATENT NO. : 6,690,754 B1
APPLICATION NO. : 09/326785
DATED : February 10, 2004
INVENTOR(S) : Haratsch et al.

It is certified that error appears in the above-identified patent and that said Letters Patent is hereby corrected as shown below:

Title page item [54] In the References Cited, change the final "Other Publications" reference to read:
--W. Lee and F. Hill, "A Maximum-Likelihood Sequence Estimator with Decision-Feedback Equalization", IEEE Transactions on Communications, vol. 25, Issue 9, 971-979 (Sep. 1977).--.

In the specification, column 2, line 60, "tentativnre" should be changed to read as:
--tentative--.

In the specification, column 3, line 40 should be changed to read as:
--has a length, L, denoted by $\{f_k\}_{k=0}^{L}$, where $f_k$ is the--.

In the specification, column 4, line 17 should be changed to read as:
--interference introduced by the tail channel taps $\{f_k\}_{k=U+1}^{L}$,--.

In the specification, column 4, line 19 should be changed to read as:
--interference introduced by only the initial channel taps $\{f_k\}_{k=1}^{U}$ --.

In the specification, column 5, line 38 should be changed to read as:
--expressed as $\rho_n = (\sigma_{n-K}; X_{n-K}^{m_K},...,X_{n-1}^{m_1})$ where $X_{n-i}^{m_i}$ --.

In the specification, column 5, lines 44-45 should be changed to read as:
--The reduced trellis has $S' = S \times 2^{m_1+...+m_k}$ states.--.

In the specification, column 5, line 62, before "previously" and after "the" replace "k" with --K--.

In the specification, column 6, line 18 should be changed to read as:
--$b = 2^{m'}$ extensions, then the resulting bM paths are tested for--.

In claim 1, column 6, line 40, "L+ taps" should be changed to read as:
--L+1 taps--.

In claim 11, column 7, line 11, "L+ taps" should be changed to read as:
--L+1 taps--.

CERTIFICATE OF CORRECTION (continued)
U.S. Pat. No. 6,690,754 B1

In claim 20, column 8, line 10, "L+ taps" should be changed to read as:
--L+1 taps--.

In claim 21, column 8, line 19, "L+ taps" should be changed to read as:
--L+1 taps--.

In claim 22, column 8, line 27, "L+ taps" should be changed to read as:
--L+1 taps--.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 6,690,754 B1
APPLICATION NO. : 09/326785
DATED : February 10, 2004
INVENTOR(S) : Haratsch et al.

It is certified that error appears in the above-identified patent and that said Letters Patent is hereby corrected as shown below:

Title page item [56] In the References Cited, change the final "Other Publications" reference to read:
--W. Lee and F. Hill, "A Maximum-Likelihood Sequence Estimator with Decision-Feedback Equalization", IEEE Transactions on Communications, vol. 25, Issue 9, 971-979 (Sep. 1977).--.

In the specification, column 2, line 60, "tentativnre" should be changed to read as:
--tentative--.

In the specification, column 3, line 40 should be changed to read as:
--has a length, L, denoted by $\{f_k\}_{k=0}^{L}$, where $f_k$ is the--.

In the specification, column 4, line 17 should be changed to read as:
--interference introduced by the tail channel taps $\{f_k\}_{k=U+1}^{L}$, --.

In the specification, column 4, line 19 should be changed to read as:
--interference introduced by only the initial channel taps $\{f_k\}_{k=1}^{U}$ --.

In the specification, column 5, line 38 should be changed to read as:
--expressed as $\rho_n = (\sigma_{n-K}; X_{n-K}^{m_K}, ..., X_{n-1}^{m_1})$ where $X_{n-i}^{m_i}$ --.

In the specification, column 5, lines 44-45 should be changed to read as:
--The reduced trellis has $S' = S \times 2^{m_1 + ... + m_k}$ states.--.

In the specification, column 5, line 62, before "previously" and after "the" replace "k" with --K--.

In the specification, column 6, line 18 should be changed to read as:
--$b = 2^{m'}$ extensions, then the resulting bM paths are tested for--.

In claim 1, column 6, line 40, "L+ taps" should be changed to read as:
--L+1 taps--.

In claim 11, column 7, line 11, "L+ taps" should be changed to read as:
--L+1 taps--.

CERTIFICATE OF CORRECTION (continued)
U.S. Pat. No. 6,690,754 B1

In claim 20, column 8, line 10, "L+ taps" should be changed to read as:
--L+1 taps--.

In claim 21, column 8, line 19, "L+ taps" should be changed to read as:
--L+1 taps--.

In claim 22, column 8, line 27, "L+ taps" should be changed to read as:
--L+1 taps--.

This certificate supersedes the Certificate of Correction issued March 30, 2010.

Signed and Sealed this

Twentieth Day of April, 2010

David J. Kappos
*Director of the United States Patent and Trademark Office*